(12) United States Patent
Feldman et al.

(10) Patent No.: US 6,442,545 B1
(45) Date of Patent: Aug. 27, 2002

(54) TERM-LEVEL TEXT WITH MINING WITH TAXONOMIES

(75) Inventors: Ronen Feldman, Petach Tikvah; Yehonatan Aumann, Jerusalem; Jonathan Schler, Petach Tikvah; David Landau, Rehovot; Orly Lipshtat, Jerusalem; Yaron Ben-Yehuda, Ramat Gan, all of (IL)

(73) Assignee: Clearforest Ltd., Petach Tikva (IL)

( * ) Notice: Subject to any disclaimer, the term of this patent is extended or adjusted under 35 U.S.C. 154(b) by 0 days.

(21) Appl. No.: 09/323,491

(22) Filed: Jun. 1, 1999

(51) Int. Cl.[7] ............................................... G06F 17/30
(52) U.S. Cl. .............................................. 707/6; 707/10
(58) Field of Search ............................. 707/6, 10, 102, 707/104.1; 709/203

(56) References Cited

U.S. PATENT DOCUMENTS 6,233,575 B1 * 5/2001 Agrawal et al. ................ 707/6

OTHER PUBLICATIONS

"Mining Text Using Keyword Distributions", by Ronen Feldman, et al., Proceedings of the 1995 Workshop on Knowledge Discovery in Databases.

"Finding Associations in Collections of Text", by Ronen Feldman, et al., Machine Learning and Data Mining: Methods and Applications, Edited by R.S. Michalski, et al., John Wiley & Sons, Ltd., 1997.

"Technology Text Mining, Turning Information Into Knowledge: A White Paper from IBM", Edited by Daniel Tkach, Feb. 17, 1998.

"Text Mining at the Term Level", by Feldman, et al., Proceedings of the 1998 Workshop on Knowledge Discovery in Databases, Aug. 1998.

* cited by examiner

Primary Examiner—Dov Popovici
Assistant Examiner—Apu M Mofiz
(74) Attorney, Agent, or Firm—Pennie & Edmonds LLP

(57) ABSTRACT

A method for mining in a database including documents, the documents including text. The method includes providing a taxonomy of taxonomy terms, and mining the documents responsive to the taxonomy to discover a relationship between a set of one or more selected words and at least one of the taxonomy terms. The method also includes analyzing occurrences of the relationship over a plurality of the documents to extract information relating to the at least one taxonomy term.

59 Claims, 8 Drawing Sheets

Microfiche Appendix Included
(5 Microfiche, 424 Pages)

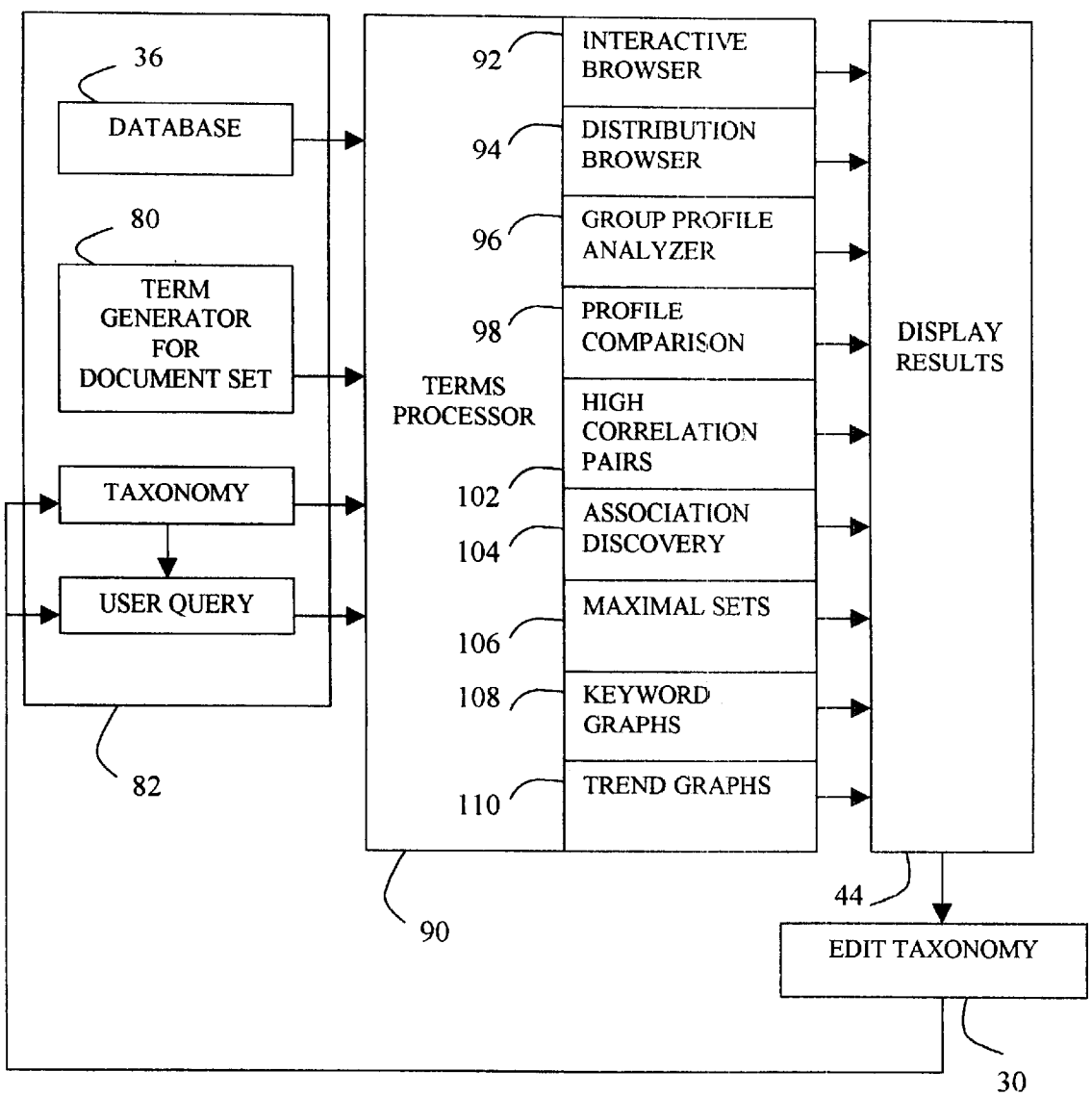

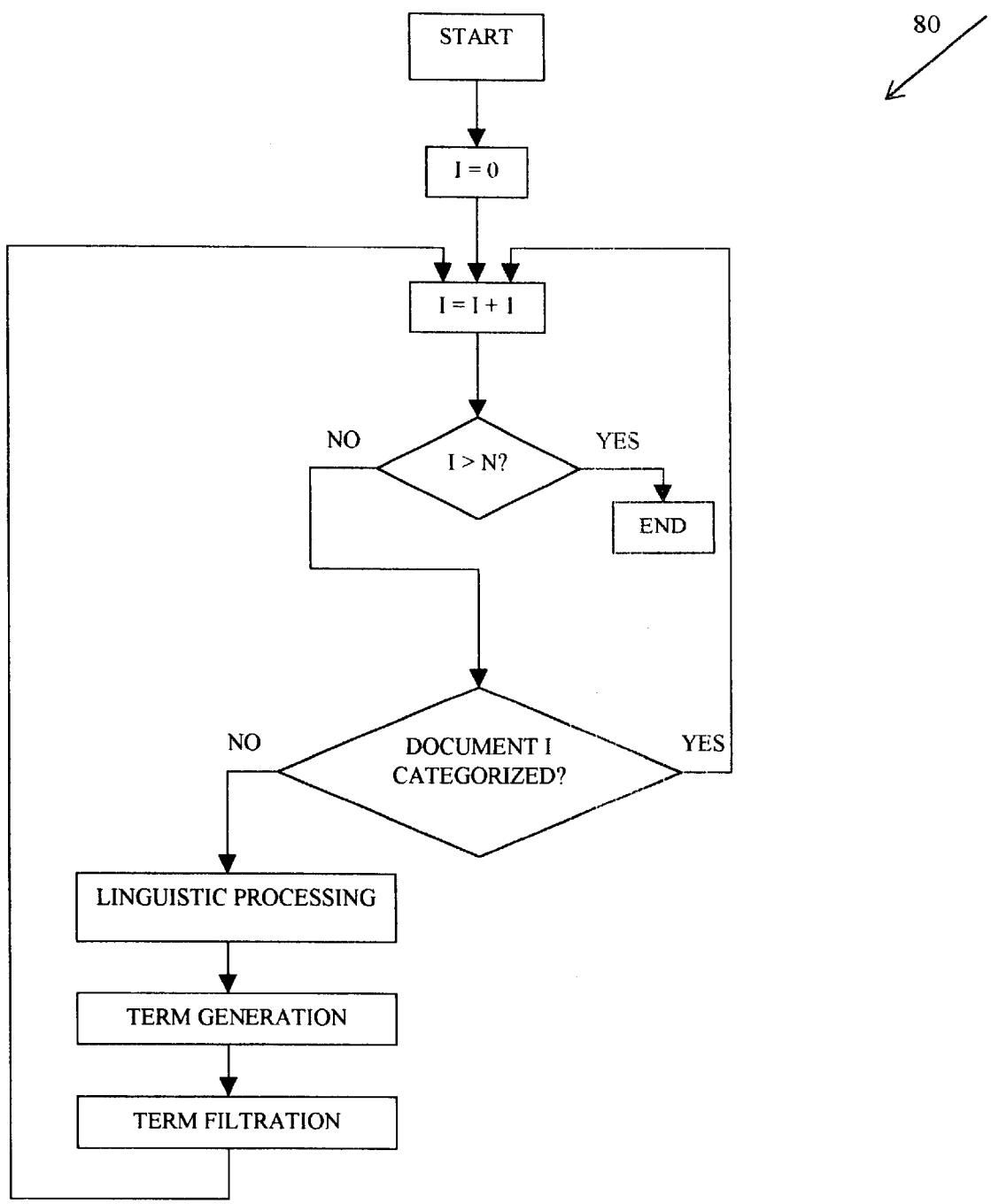

TERM-LEVEL TEXT WITH MINING WITH TAXONOMIES

MICROFICHE APPENDIX

A computer printout is attached hereto as an appendix in microfiche form and is incorporated herein by reference. The printout comprises executable program files in hexadecimal format. This appendix includes 5 microfiches, containing a total of 424 frames.

FIELD OF THE INVENTION

The present invention relates generally to extraction of information from databases, and specifically to text mining in unstructured databases.

BACKGROUND OF THE INVENTION

Knowledge Discovery in Databases (KDD) focuses on the computerized exploration of large quantities of data, and on the discovery of interesting patterns within them. While most work on KDD has been concerned with analyzing structured databases, there has been relatively little development of methods for analyzing the large quantity of information that is currently available only in unstructured, text-based form. An example of work in this latter category is described in "Mining Text Using Keyword Distributions," by Ronen Feldman, Ido Dagan, and Haym Hirsh, *Proceedings of the* 1995 *Workshop on Knowledge Discovery in Databases,* which is incorporated herein by reference. Other work is described in "Finding Associations in Collections of Text," by Ronen Feldman and Haym Hirsh, *Machine Learning and Data Mining: Methods and Applications,* edited by R. S. Michalski, I. Bratko, and M. Kubat, John Wiley & Sons, Ltd., 1997, which is also incorporated herein by reference.

A paper entitled "Technology Text Mining, Turning Information Into Knowledge: A White Paper from IBM," edited by Daniel Tkach, Feb. 17, 1998, which is incorporated herein by reference, describes a program called IBM Intelligent Miner for Text, which extracts terms from unstructured text. "Terms," in the context of the present application, are single words, or short strings of highly-related, linked words, such as "Biotechnology," "New York Stock Exchange," "Free market," or "Health programs." "Term extraction," in the context of the present application, refers to the process of finding terms in a document that have relevance to the content of the document.

InQuery 5.0, produced by Sovereign Hill Software, uses term extraction to identify names of companies and people in one or more documents. The extracted terms are used to enable a search engine to find desired documents responsive to a user's query.

A paper entitled "Text Mining at the Term Level," by Feldman et al., *Proceedings of the* 1998 *Workshop on Knowledge Discovery in Databases,* August, 1998, which is incorporated herein by reference, the authors of which are the inventors of the present invention, describes a method for extracting terms from a document in a database, filtering out unimportant terms, and subsequently performing text mining in the database. "Text mining," in the context of the present application, refers to a substantially automated process of extracting useful information from a collection of textual data.

Standard text mining systems typically process documents which have been "categorized," i.e., manually-or automatically-assigned keywords ("tags") in order to identify their content. Automatic tagging is generally performed by matching words in a document with words from a predetermined list.

SUMMARY OF THE INVENTION

It is an object of some aspects of the present invention to provide improved methods for text mining.

It is a further object of some aspects of the present invention to provide improved methods for comparing multiple documents in a database.

It is yet a further object of some aspects of the present invention to provide improved methods for extracting information from multiple documents in a database.

In preferred embodiments of the present invention, a system for mining text in a database comprises a memory, which stores a hierarchical taxonomy of terms, and a processor, which uses the taxonomy to perform effective mining of the database. Preferably, the system enables quantitative, content-based, textual analysis of a large number of documents in the database, in order to present relationships between two or more entries in the taxonomy.

Preferably, a user provides an input indicating terms of interest (some or all of which may be in the taxonomy), and the processor subsequently discovers relationships between terms in the user's input and terms in the taxonomy. Typically, relationships discovered during text mining comprise co-occurrences of two terms in a single document. Preferably, if the user "selects" one of the relationships generated by the text analysis, the system displays relevant portions of original documents in the database which are associated with the discovered relationship.

In some preferred embodiments of the present invention, terms in the term taxonomy ("taxonomy terms") can be edited by the user prior to text mining, and the taxonomy can be modified automatically by the processor and/or interactively with the user, responsive to results of the text mining. Typically, interactive editing of the term taxonomy responsive to results of the text mining yields improved results from a subsequent iteration of text mining, and these improved results may themselves be used to modify the taxonomy again. In this manner, the user may derive information of increased value from each iteration of text mining and term taxonomy modification.

In some preferred embodiments of the present invention, the taxonomy generally has a Directed Acyclic Graph (DAG) structure or a tree structure, and comprises groups of related terms (siblings) stored in the hierarchy one level below respective parent entries. For example, under a parent entry, "Countries," the taxonomy may contain as daughter entries the list of member nations of the United Nations. (The parent entry "Countries" may itself also be a member of a set of siblings in the taxonomy, under a "grandparent" entry, "Political entities.") Prior to text mining, in this example, the user may add the name of a new member nation, or delete the name of a country whose name has changed. Following text mining of the database, and utilizing results derived therefrom, the user may choose to further edit the term taxonomy (for instance, by adding a new country name or variation thereof).

In some preferred embodiments, the taxonomy has multiple levels, and a broad range of terms in each level, so that the user can narrow or broaden a query prior to an iteration of text mining, in order to optimize the results generated by the processor. For example, if the user would like to investigate President Clinton's foreign policy, she might enter an initial query specifying "Clinton" and all daughter entries of the node "Countries." To broaden the query, "Countries" could be replaced by "Political entities," so that a news article, containing the words "Berlin" and "Paris," but not "Germany" and "France," would also generate a positive response to the query. Alternatively, to narrow the query, the user could specify a taxonomy node "G7 countries," instead of "Countries." In general, a rich, multilevel taxonomy enables the user to enter queries with a desired level of specificity, and to thereby obtain information most relevant to her needs.

In a preferred embodiment, the processor prompts the user to refine the query prior to mining of the database's text, in order to optimize the results generated by the processor. For example, if the user enters a query including the words "Colombia" and "Venezuela," the processor preferably examines the taxonomy, determines that the two terms are daughter entries of a parent entry, "South American countries," and asks the user whether the two specified terms should be replaced by the names of all of the countries in South America listed in the taxonomy. Alternatively or additionally, the processor examines daughter entries of "Colombia" and "Venezuela," and asks the user whether some or all of the daughter entries (for instance, names of cities or politicians) should be added to the query.

In preferred embodiments of the present invention, text mining typically includes determining relationships among terms found in the database which relate to the user's query. Preferably, according to some preferred embodiments of the present invention, the processor subsequently uses these discovered relationships in order to suggest modifications to the taxonomy. For example, if the user's query includes the word "Venezuela" and a taxonomy node "Natural resources," then text mining of the database may determine that the terms "Crude oil," "Coffee," "Sugarcane," and "Bananas" occur with high frequency in documents in the database having the word "Venezuela" and at least one daughter entry of "Natural resources". If, from this list, only "Sugarcane" is not a daughter entry of "Natural resources," then the processor preferably prompts the user to indicate whether "Sugarcane" should be added to the taxonomy as a daughter entry of "Natural resources". Should the user agree, then in processing a subsequent query including, for example, a taxonomy node "Ecological issues" and the taxonomy node "Natural resources", the processor will already "know" that sugarcane is a natural resource. In this manner, useful information derived by the text mining process is reported to the user, and is additionally used to improve the taxonomy in order to enhance the effectiveness of subsequent mining of the same or a different database.

Alternatively or additionally, the results of text mining may indicate to the user that a new node should be added to the taxonomy, or that an existing node should be supplemented in light of the generated results. For example, during text mining of a news database, the inventors entered a query including the term, "Ford Motor Corp.," and the taxonomy node, "Companies," so that the processor would generate a list of companies ranked by their frequency of co-occurrence with Ford. Most of the top 10 companies listed were car companies, and this might suggest to the user to create a new node, "Car companies," and to copy the appropriate companies into the new node.

In some preferred embodiments of the present invention, relationships in the database found during text mining yield knowledge about general informational content, or about specific facts or specific events inherent in the text of the documents. For example, a query including the above-mentioned parent entry, "Countries, " and an additional term, "Crude oil," was used by the inventors to find that Iran, Saudi Arabia, and the United States regularly appeared in news stories with one or more of at least five other countries, whereas Japan, for instance, only appeared a significant number of times in news stories mentioning Iran. Notably, this potentially useful knowledge is produced by a program implementing the principles of the present invention without requiring the user to ask specific questions. Rather, correlations and relationships discovered during text mining are preferably output automatically, in an appropriate form (e.g., text, table, or graph), in order to yield information relevant to the user's query.

Additionally, a specific fact, for example, that "Bill Clinton" is the "President" of "the United States of America," can be deduced in these embodiments from a sentence in the middle of a document in the database, "US President Bill Clinton addressed a trade meeting on Thursday." Typically, "President" is in a list of relationship terms which are known by a program implementing these embodiments to link a person's name and a country or company. Additionally, a list of synonyms ("US"="the United States of America") is preferably already known to the processor.

In a similar manner, specific events can be extracted from a document's text. For example, "merger" is a relationship term known to link the names of two companies. If the word "merger" were found in the text of a document, the program would scan the "Companies" node in the taxonomy and report if two known company names are found in the vicinity of "merger," and are grammatically linked to "merger" according to predetermined rules.

In a further example, text mining of a news database comparing all documents mentioning "Microsoft," and the subset of those documents which also contain "Justice Department," may reveal that the term "Explorer" is correlated more strongly with documents in the latter set than with documents in the former set. Preferably, this information is automatically revealed by the program, and thus may reveal a useful fact which the user might not have known. Text mining, according to the present invention, allows the user to "mine" a database for potentially useful, unknown, and perhaps unsuspected, information, by enabling her to: discover significant correlations between a term in a query and one or more other terms in the database; find time-based trends of a given term or of its correlation with a second term; and compare two or more terms with respect to another term.

There is therefore provided in accordance with a preferred embodiment of the present invention, a method for mining in a database including documents that include text. The method comprises providing a taxonomy of taxonomy terms, mining the documents responsive to the taxonomy to discover a relationship between two or more of the taxonomy terms, analyzing occurrences of the relationship over a plurality of the documents to extract information not specified by the taxonomy relation to the two, or more taxonomy terms, and persenting the information relating to the two or more taxonomy terms to a user.

In a preferred embodiment, analyzing occurrences of the relationship comprises identifying, responsive to the taxonomy, one of: a fact and an event, inherent in the text of one of the documents. The fact or event may be identified by the proximity, in one of the documents, of the two or more taxonomy terms to a predetermined relationship term.

Preferably, the taxonomy comprises nodes and one of the nodes is a parent entry of the two or more taxonomy terms. Alternatively or additionally, the taxonomy comprises a hierarchy of nodes, wherein a first node is a parent entry of at least one of the two or more taxonomy terms, wherein a second node is also a parent entry of at least one of the two or more taxonomy terms, and wherein the relationship comprises a relationship between the second node and the first node.

Preferably, analyzing comprises analyzing, over a plurality of the documents, co-occurrences of substantially every one of the two or more taxonomy terms with substantially every other one of the two or more taxonomy terms, to determine relationships among the two or more taxonomy terms; and presenting the information comprises displaying at least some of the two or more taxonomy terms and displaying an output indicative to the number of the co-occurrences of substantially each of the at least some terms with substantially every other one of the at least some terms.

In one embodiment, the method further comprises displaying a portion of the text of at least one of the documents responsive to the discovered relationship.

Preferably, mining includes extracting a set of one or more document-labeling terms from one of the documents, wherein the set includes the two or more taxonomy terms. Extracting the set of document-labeling terms from the document may comprise determining the grammatical structure of a sentence in the document's text and identifying a group of one or more words in the sentence as a document-labeling term responsive to the grammatical structure. Preferably, extracting the set of document-labeling terms from the document may comprises: examining the document, identifying a candidate term in the document, comparing a frequency of occurrence of the candidate term in the document with frequencies of occurrence of the candidate term in other documents in the database to determine differences in the respective frequencies of occurrence, and inserting the candidate term into the set of document-labeling terms corresponding to the document responsive to the comparison.

In one preferred embodiment, discovering the relationship comprises finding in at least one of the documents a co-occurrence of at least some portion of the two or more taxonomy terms. The two or more taxonomy terms may comprise a cluster of taxonomy terms, wherein the cluster is characterized by the property that terms in the cluster generally have a higher frequency of co-occurrence with respect to each other than their frequency of co-occurrence with respect to terms not in the cluster. Also, discovering the relationship may comprise assigning a weight to the co-occurrence responsive to a distance between a first term and a second term of the two or more taxonomy terms, and wherein analyzing occurrences of the relationship comprises analyzing the relationship responsive to the weight. For example, a first term and a second term of the two or more taxonomy terms may co-occur in a document when a distance between the first and second terms is less than a predetermined distance. The predetermined distance may be, for instance, approximately one paragraph or approximately one sentence.

In another embodiment, discovering the relationship comprises discovering a plurality of relationships in two or more of the documents where analyzing comprises: analyzing the relationships in a first set of the two or more documents, in order to determine a first relationship between the two or more taxonomy terms; analyzing the relationships in a second set of the two or more documents, in order to determine a second relationship between the two or more taxonomy terms; and comparing the first and second relationships. The first set of documents may comprise documents from a first time period, and the second set of documents may comprise documents from a second time period.

In a preferred embodiment, at least one of the two or more taxonomy terms is selected by the user, and, in one embodiment, each of the two or more taxonomy terms is selected by the user. Also, presenting the information may comprise displaying a graph comprising a plurality of points, each point representing one of the two or more taxonomy terms, and one or more lines, each line connecting two of the points and indicating a quantitative relationship between the terms represented by said two points. For example, the thickness of each line in the graph, a number displayed near each line in the graph, or the color of each line in the graph may indicate the quantitative relationship. The quantitative relationship indicated by a line in the graph is preferably a co-occurrence frequency of the terms represented by the two points connected by that line.

There is further provided, in accordance with a preferred embodiment of the present invention, a method for mining in a database including documents, the documents including text. The method comprises providing a taxonomy of taxonomy terms, mining the documents responsive to the taxonomy to discover a relationship between a set of one or more selected words and at least one of the taxonomy terms, and modifying the taxonomy responsive to the discovered relationship. The taxonomy may comprise a hierarchy of nodes, wherein the at least one taxonomy term comprises two or more related taxonomy terms, one of the nodes is a parent entry of the two or more taxonomy terms, and wherein modifying comprises assigning one of the selected words to be a sibling of the two or more taxonomy terms responsive to the discovered relationship.

The present invention additionally provides a method for mining in a database including documents, the documents including text, where the method comprises providing a taxonomy of taxonomy terms, mining the documents at a taxonomy term level to provide mining results indicative of a relationship between a plurality of terms including at least one taxonomy term, wherein at least one of the terms is specified by a user, and prompting the user to modify the taxonomy based on the mining results. The method preferably further comprises performing a statistical analysis on the mining results to determine a potential modification of the taxonomy and prompting the user on whether or not to carry out the potential modification of the taxonomy. At least one of the plurality of terms may be received in a query entered by the user. In one embodiment, at least one of the plurality of terms is a taxonomy term specified by the user.

The present invention yet further provides a method for mining in a database including documents, the documents including text, with the method comprising providing a taxonomy of taxonomy terms; receiving a query from a user, the query specifying at least one term of interest; mining the documents at a taxonomy term level to provide a first set of mining results indicative of a relationship between the at least one term of interest and at least one of the taxonomy terms; modifying the taxonomy based, at least in part, on the first set of mining results; and mining the documents at a modified taxonomy term level to provide a second set of mining results indicative of the relationship. The method may further comprise, in response to the query, displaying to the user a portion of the taxonomy relevant to the at least one term of interest, and enabling the user to revise the query by including in the query at least one of the taxonomy terms in the displayed portion.

The present invention still further provides a method for mining in a database including documents, the documents including text, the method comprising providing a taxonomy of taxonomy terms; receiving an initial query from a user, the query specifying at least one term of interest; displaying to the user a portion of the taxonomy relevant to the at least one term of interest; receiving an indication from the user to revise the query by including in the query at least one taxonomy term in the displayed portion; and mining the documents at a taxonomy term level based on the revised query to provide mining results indicative of a relationship between the at least one taxonomy term and one or more other terms.

The present invention also provides a method for mining in a database including documents, the documents including text, the method comprising providing a taxonomy of taxonomy terms; mining the documents at a taxonomy term level to provide mining results indicative of a relationship between a plurality of terms including at least one taxonomy term, wherein at least one of the terms is specified by a user; and presenting the mining results to the user by displaying a graph comprising a plurality of points, each point representing one of the plurality of terms, and one or more lines, each line connecting two of the points and indicating a quantitative relationship between the terms represented by said two points.

The present invention additionally provides apparatus and computer program products for carrying out the above-described methods.

BRIEF DESCRIPTION OF THE DRAWINGS

FIG. 2 is a block diagram schematically illustrating details of a text mining algorithm, for use in executing the method of FIG. 1B, in accordance with a preferred embodiment of the present invention;

FIG. 7 is a flow chart schematically illustrating a method for term generation, for use in executing the text mining algorithm of FIG. 2, in accordance with a preferred embodiment of the present invention.

DETAILED DESCRIPTION OF PREFERRED EMBODIMENTS

Figure 1A:
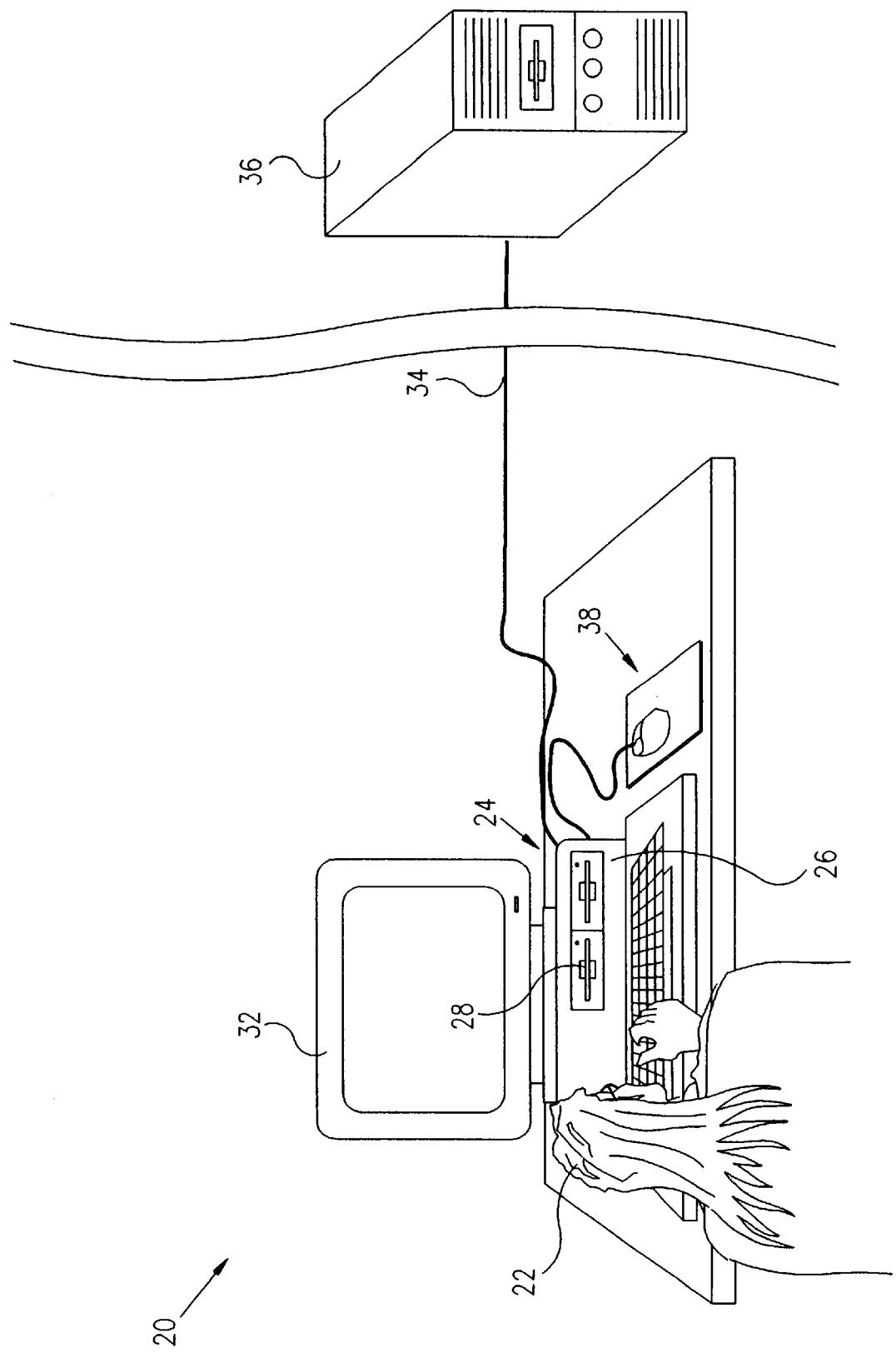
FIG. 1A is a schematic pictorial view illustrating a system for text mining of a database, in accordance with a preferred embodiment of the present invention.

FIG. 1A is a schematic diagram illustrating a system 20, comprising a controller 24 which performs text mining in a database 36, in accordance with a preferred embodiment of the present invention. Examples of text mining operations, as provided by the present invention, are described hereinbelow with reference to FIG. 2. Controller 24 preferably comprises a text mining processor 26, a taxonomy storage unit 28, a monitor 32, and an input device 38. Database 36 is typically coupled to controller 24 by a network 34, as shown in FIG. 1A, but may alternatively be located within controller 24.

Preferably, taxonomy storage unit 28 comprises a hard disk or other mass storage device, upon which is stored a hierarchical term taxonomy. Typically, the taxonomy has a Directed Acyclic Graph (DAG) structure or a tree structure, such as that shown in Table I hereinbelow, in which are stored a large number of terms, some of which are preferably related, similar or identical to terms in a query entered by a user 22 of system 20. For example, under a parent entry, "Companies," there may be a series of daughter entries, including "Ford Motor Corp.," "Merck Corp.," and "Microsoft Corp." (Typically, broad nodes such as "Companies" or "Names" have thousands of daughter entries.) Under the entry "Microsoft Corp.," there may be additional daughter entries, "Management," "Employees," "Products," "Development facilities," and "Major shareholders. " As described hereinbelow, the taxonomy is preferably used prior to, during, and/or following a text mining iteration, in order to add power and effectiveness to controller 24's implementation of user 22's query. Alternatively, other data structures known in the art of data storage and retrieval are used to store the taxonomy.

TABLE I

| Companies | | | |
|---|---|---|---|
| → | Ford | | |
| → | Merck | | |
| → | Microsoft | | |
| | → | Management | |
| | → | Employees | |
| | → | Products | |
| | | → | MS-DOS |
| | | → | MS Office |
| | | → | MS Works |
| | | → | MS Publisher |
| | | → | MS Word |
| | → | Development facilities | |
| | → | Major Shareholders | |

Text mining processor 26 preferably comprises a central processing unit (CPU), which executes one or more programs to process user 22's query, carry out text mining responsive thereto, and, typically, semi-automatically modify the taxonomy responsive to the results of the text mining, as described hereinbelow.

Database 36 typically comprises documents, each comprising text. For example, some of the documents may be news stories, articles in an encyclopedia, books, lists, or other collections of text stored in a digital form. Alternatively or additionally, the one or more documents in database 36 may comprise respective sentences, paragraphs, or sections, from a single file containing text. It will be understood by one skilled in the art that although preferred embodiments of the present invention are described with respect to text stored in each document, the documents may additionally contain video, audio, or other data forms which typically are not processed during application of the present invention. Alternatively, means are employed to extract textual data from audio or graphical components of a document, for example by applying speech-to-text algorithms or optical character recognition algorithms.

The documents stored in database 36 are not necessarily all located in one location. For some applications of the present invention, they are distributed on many servers coupled to, for example, the World Wide Web or a corporate Intranet, and are accessed by controller 24 through network 34 prior to, or during, text mining. For some of these applications, a Web crawler, as is known in the art, or an index of Web sites, is utilized in generating the collection of documents to be operated upon during text mining.

Figure 1B:
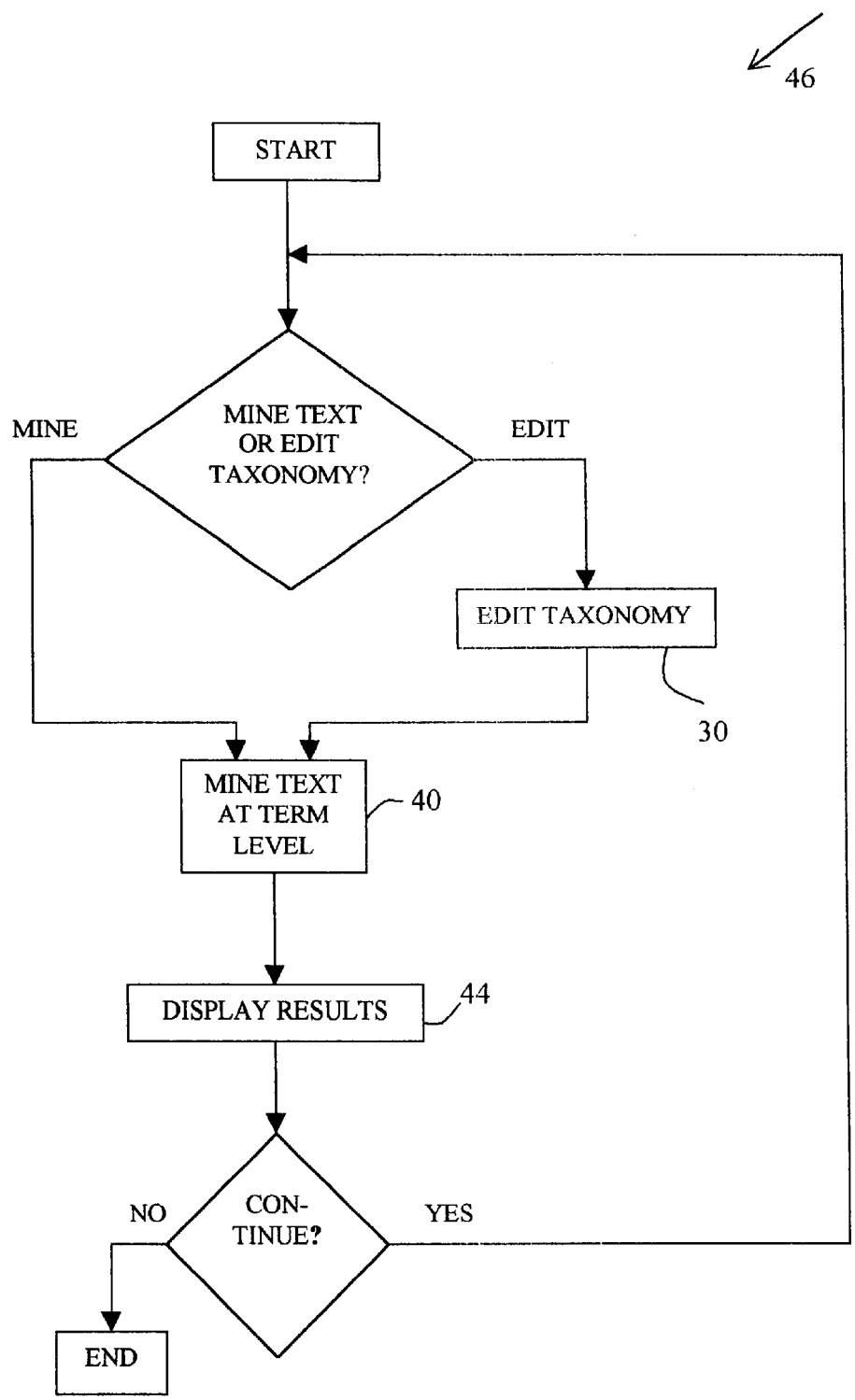
FIG. 1B is a flow chart schematically illustrating a method for text mining, for use by the system of FIG. 1A, in accordance with a preferred embodiment of the present invention.

FIG. 1B is a flow chart schematically illustrating a method 46 for text mining in database 36, in accordance with a preferred embodiment of the present invention. Method 46, according to the present invention, preferably comprises two main steps: "mine text at the term level" 40 and "edit taxonomy" 30. Mining step 40 preferably receives the query from user 22, examines and analyzes the taxonomy, and, optionally, assists the user in refining the query in light of the analysis, using methods described hereinbelow. Subsequently, mining step 40 performs the text mining, as described hereinbelow, and displays the results of the text mining obtained thereby. In taxonomy editing step 30, processor 26 preferably analyzes the results of the text mining and suggests modifications to the taxonomy responsive to this analysis.

For example (using the sample taxonomy shown in Table I), if the user's initial query includes the term "Microsoft Corp.," then, prior to text mining, processor 26 preferably displays the relevant section of the taxonomy, and enables the user to indicate whether the term "Microsoft Corp.," in particular, should be used in implementing the query, or whether, in addition, documents including daughter entries of one or more of "Management," "Employees," "Products," "Development facilities," and "Major shareholders,"—but not the term "Microsoft Corp." itself—should be retrieved during searching of the database for relevant documents. In this manner, depending on the user's response, an article citing only "Bill Gates" or "MS-DOS" may be labeled as relevant to the user's query.

Following analysis of the results of the text mining, processor 26 may ask user 22 whether other terms, which were found during text mining to be highly correlated with some or each of the daughter entries of "Products," should be added to the taxonomy as siblings of existing daughter entries "MS-DOS," "Microsoft Office," "Microsoft Works," "Microsoft Publisher," and "Microsoft Word." In this example, the processor might suggest adding the terms, "Microsoft Excel," "Microsoft Photo Editor," "Microsoft Outlook," and "Desktop computer." User 22 may choose to add none, some, or all of the suggested terms at the proposed location in the taxonomy, and/or at one or more other nodes. Typically, as in this example, some of the suggestions are appropriate, while others (i.e., "Desktop computer") are highly correlated with the siblings in the suggested node, but nevertheless would not generally be chosen by the user for insertion into the taxonomy.

FIG. 2 is a block diagram schematically illustrating details of text mining step 40 of method 46, in accordance with a preferred embodiment of the present invention. Text mining step 40 preferably comprises an input block 82 and a terms processor block 90, which sends output to a results display block 44.

Preferably, input block 82 comprises the inputs to the text mining process, including database 36, the taxonomy, the user's query, and a "term generator" 80 for the set of documents. Term generator 80 is typically implemented using an algorithm similar to that described in the above-mentioned paper, "Text Mining at the Term Level," and is described hereinbelow with reference to FIG. 7. Terms are typically defined based on grammatical rules, such as "Noun-noun" (e.g., "Stock trader"), "Noun-preposition-noun" (e.g., "King of Jordan"), etc. Preferably, term generator 80 extracts from each document in database 36 a set of terms which generally represent the contents of the respective document. For example, term generator 80 analyzed an article in the Reuters Financial News Database, and identified terms like "Net income," "Bank," "Earnings," "Canada," "Mutual Fund," and "National Bank of Canada" as being particularly relevant to the content of the article, while it rejected terms like "Jump," "Season," and "Group," for being not particularly relevant to the article's content.

Figure 3:
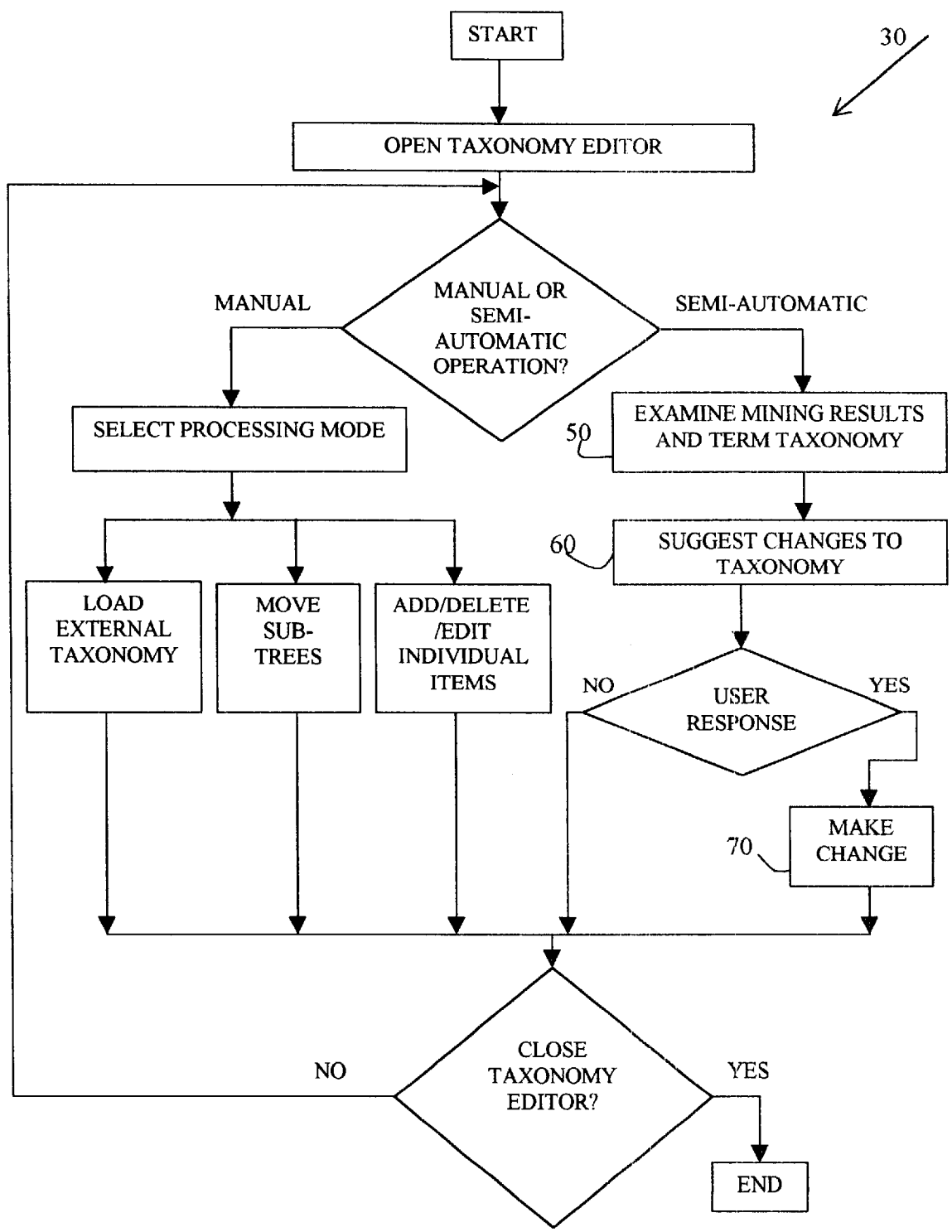
FIG. 3 is a flow chart schematically illustrating a method for editing a taxonomy, for use in executing the method of FIG. 1B, in accordance with a preferred embodiment of the present invention.
Figure 4:
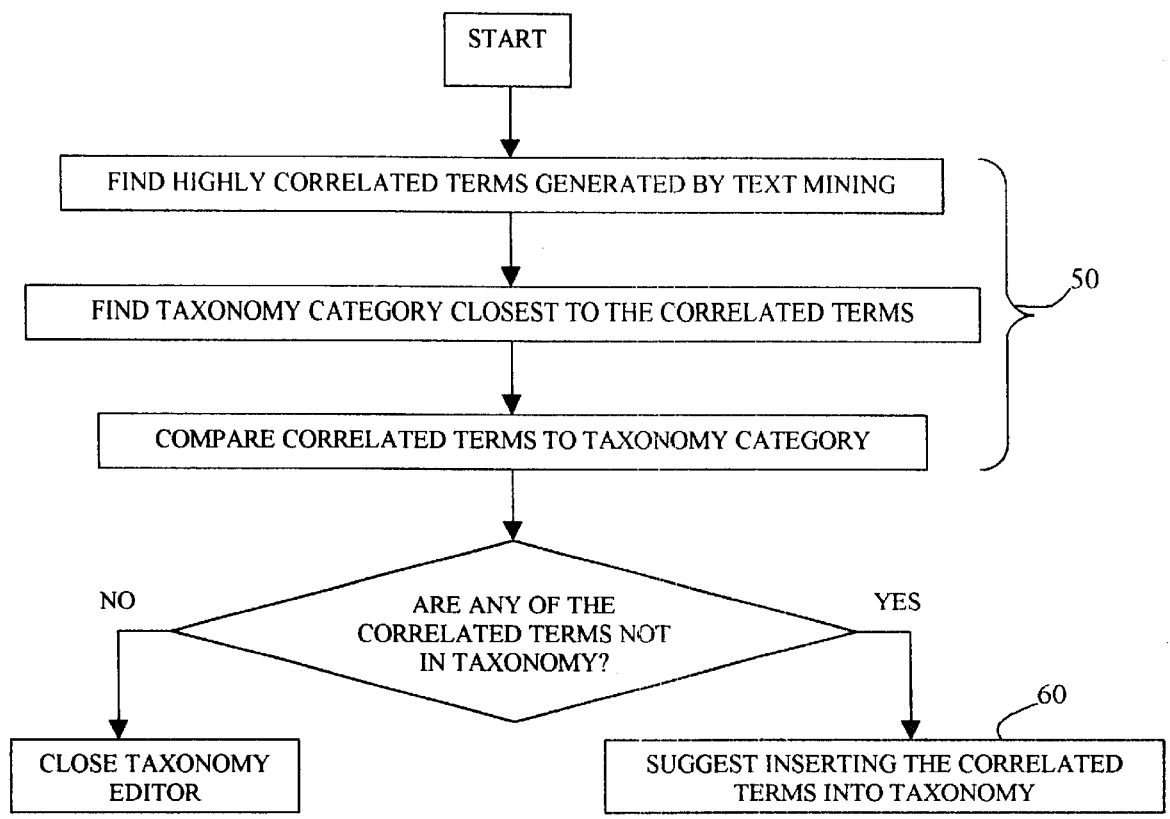
FIG. 4 is a flow chart schematically illustrating details of the taxonomy editing method of FIG. 3, in accordance with a preferred embodiment of the present invention.

Reference is now made to FIGS. 2, 3 and 4. FIG. 3 is a flow chart schematically illustrating details of taxonomy editing step 30, in accordance with a preferred embodiment of the present invention. FIG. 4 is a flow chart schematically illustrating details of steps 50 and 60 of editing step 30, in accordance with a preferred embodiment of the present invention. A variety of useful text mining functions are provided by the present invention, as described hereinbelow. In applying these functions, the present invention provides the user with the ability to essentially continuously and interactively revise the taxonomy responsive to results of text mining shown by display block 44, and to use the revised taxonomy to refine the query, in order to enhance the user's ability to derive useful information from system 20.

As described hereinabove with reference to FIG. 1B, and as shown in FIG. 2, the taxonomy is preferably used to optimize the user's query, in order to add power and effectiveness to the text mining process. For example, if the user is interested in discovering computer companies having significant dealings in the United States and France, then, in general, the query should include the nodes "Computer companies," "United States," and "France." Processor 26 preferably displays relevant sections of the taxonomy, and allows the user to indicate whether all or some of the following terms should be added to the query as optional replacements for the corresponding terms in the original query: {"Microsoft", "IBM", "Apple", "Compaq"}, {"Washington", "America", "United States of America", "USA", "American"}, and {"Paris", "French", "European Community"}. Additionally, parent entries, daughter entries, granddaughter entries, etc., of any chosen term can be specified by the user to be included in the query. Should each of the cited terms be chosen to be added to the query, then a news article, whose list of terms created by generator 80 includes {"Microsoft", "America", "France"} would be available for analysis by text mining, even though it does not contain even one word from the original query. Furthermore, after a first iteration of text mining, processor 26 may find in step 50 (FIGS. 3 and 4) that each of the following terms occurs with high frequency in documents matching the revised query, compared to the terms' frequencies in all documents in database 36: {"White House", "US", "Trade controls", "Copyright protection", "Dell", "Bill Clinton", "Jacques Chirac", "European Parliament"}.

In and of themselves, these results may provide user 22 with information that she previously had not had, and which might not have been immediately available by simply applying a search engine to the same, hypothetical, news database (even with the revised query). To attain even greater power from the text mining process, user 22 is prompted in step 60 to indicate whether any of the "Result" terms should be incorporated into the taxonomy. Preferably, insertions into and editing of the taxonomy are performed in step 70 using user interface 38 (FIG. 1A), which typically comprises a keyboard and mouse. Most preferably, user 22 modifies the taxonomy using well-known editing tools, such as "drag-and-drop" editing, "double-clicking" upon desired entries, use of dialog boxes, etc. In the present example, user 22 might drag "White House" and "US" into the taxonomy so that these terms become siblings of "United States of America." Similarly, "Jacques Chirac" may be made a daughter entry of "France."

Typically, changes to the taxonomy are immediately used in a subsequent text mining iteration. Thus, the inclusion of the terms "Jacques Chirac," "White House," and "US" may generate a larger set of useful, relevant, documents, upon which the analysis functions provided by the present invention can be performed.

Alternatively or additionally, user 22 may choose to edit the taxonomy substantially independently of the results of the text mining process. This "manual" editing of the taxonomy typically comprises copying an external taxonomy into the current taxonomy. External taxonomies generally comprise lists, such as the names of bones in the human body, the countries and capitals of South America, the names of the planets, etc. Additionally, user 22 is preferably enabled to move or copy sub-trees of the taxonomy, or to add, delete, or edit individual entries in the taxonomy.

In a preferred operational mode, an interactive browser 92 of terms processor 90 (FIG. 2) enables the user to enter a query, to see the results of a first iteration of text mining responsive to the query, and to enter a new query based on the knowledge obtained during the first text mining iteration. In an experimental application of the interactive browser, the inventors investigated co-occurrences of daughter entries of two nodes in the taxonomy, "Business alliance topics" and "Companies," as reflected in the approximately 52,000 articles contained in the Reuters Financial News Database from 1995 and 1996. Prior to input of the query, term generator 80 in input block 82 processed the 52,000 articles, which contained an average of 864 words per article, and produced thereby an average of 45 terms per article. Prior to text mining, the taxonomy contained a set of terms, such as "Joint venture," "Strategic alliance," and "Merger," under the parent entry, "Business alliance topics," and an extensive list of company names under the parent entry, "Companies." With input block 82 thus defined (term generation, database, taxonomy, and user query), interactive browser 92 found 569 relevant references in the Reuters database, generated a list of article titles, and highlighted terms which matched the user's query, e.g., {"Apple Computer", "Sun Microsystems," "Merger talk"}, {"Lockheed Corp.", "Martin Marietta Corp.", "Merger"}, and {"Chevron Corp.", "Mobil Corp.", "Joint venture"}.

Additionally, while using interactive browser 92, user 22 can employ a distribution browser 94 of terms processor 90, in order to cause a statistical analysis to be performed on the text mining results. For example, in the above-cited experiment, the distribution of all daughter entries of "Business alliance topics" was calculated, revealing that "Joint venture" had the highest frequency of occurrence (relative to its siblings) in the 569 references. A "Company" distribution was subsequently calculated on those articles containing the term "Joint venture," showing that IBM, General Motors and MCI were the companies that co-occurred most frequently with "Joint venture." It was additionally determined that Sprint Corp. and News Corp. were the two other companies which occurred most frequently in those articles in which MCI co-occurred with "Joint venture." Lastly, utilizing an additional node in the taxonomy, "People," a further iteration of text mining found that "Jeffrey Kagan," "Anthea Disney," and "Bill Vogel" were the three people most frequently cited in "Joint venture" articles which referred to MCI and News Corp. This example demonstrates the added power that interactive analysis of the results of text mining can yield, especially when used in conjunction with a rich taxonomy.

In some preferred embodiments of the present invention, interactive browser 92 discovers in one or more documents a specific fact or event using terms that are in the taxonomy, such as those described hereinabove, and a set of "relationship terms," which are not necessarily in the taxonomy. Relationship terms comprise words that often are an integral part of a factual statement or implication inherent in a text, and that additionally often indicate a relationship between two terms in the same sentence. Sample relationship terms, and the types of terms which they link, include:

"President" (Name⇋Country or Company),
"Senator" (Name⇋State),
"Capital" (Place⇋Country),
"Longest" (Noun⇋Noun),
"Hired" (Company⇋Name), and
"Joint venture" (Company⇋Company).

For example, the fact that "Bill Clinton" is the "President" of "the United States of America" can be deduced from a sentence in the middle of a document in the database, "US President Bill Clinton addressed a trade meeting on Thursday." Preferably, a list of synonyms is already known to the processor, for example, "US"="the United States of America." Even in cases where a relationship term and only one of the corresponding taxonomy terms is present, e.g., "President Clinton appeared invigorated after a successful ten-day trip," a useful fact can nevertheless often be gleaned from the sentence ("Clinton" is the "President").

In a similar manner, specific events can be extracted from a document's text. For example, "merger" is a relationship term known to link the names of two companies. If the word "merger" were found in the text of a document, a program implementing this embodiment would scan the "Companies" node in the taxonomy and report if two known company names are found in the vicinity of "merger," and are grammatically linked to "merger" according to predetermined rules.

A group profile analyzer 96 of terms processor 90 preferably enables user 22 to specify a set of terms and to determine an overall "profile" thereof. For example, user 22 would employ group profile analyzer 96 in order to reveal topics (i.e., terms) that are generally common among at least a predetermined number or percentage of G7 countries. Analyzer 96 preferably ranks the countries in order of closeness to the overall profile, in order to show which country tends to be in news articles discussing topics which are most common to the G7 countries, and, additionally, which country is most "unlike" the other G7 countries. If user 22 chooses, analyzer 96 can display a table, quantitatively relating each of the G7 countries to each of the respective common topics (e.g., to show that "USA" and "Crude" co-occur in 400 articles, while "Italy" and "Crude" co-occur in 150 articles). Further analysis typically comprises the determination of one or more of the topics that most differentiate each of the G7 countries from the overall profile.

Often, the group profile analyzer, used independently or with the other text mining tools, quickly gives the user an overall sense of the contents of the database, with respect to a node in the taxonomy (e.g., G7 countries, local hospitals, Ivy League universities), without the need for reading even a single article. Subsequently, the user can optionally see the actual text of one or more articles of interest (for example, those listing the names of each of the G7 countries and the word "Livestock").

In some applications, user 22 may use group profile analyzer 96 in order to suggest modifications to the taxonomy. For example, if it is found that fifteen out of twenty siblings are relatively close to the overall group profile, while five of the siblings are relatively far, the user might consider examining the five to see whether they should be split off to form a new node (e.g., the five siblings might be supercomputers, listed as siblings of fifteen personal computers).

Other investigations, performed using a "profile comparison" block 98 of terms processor 90, include comparisons of two different groups, for example G7 countries and the Arab League, in order to determine topics which are highly associated in the database with one or the other group (e.g., "Corporate bonds" or "Crude oil"). In this manner, user 22 is enabled to quickly determine similarities and/or differences between groups, without reading a single article in the database. An additional investigation, using a query including the taxonomy nodes "Caffeine-based drinks," "Country groups," and "Countries," revealed that all countries that are highly correlated with caffeine-based drinks belong either to the OAU (Organization of African Unity) or to the OAS (Organization of American States).

A "high-correlation pairs" block 102 of terms processor 90 preferably automatically locates, and presents to user 22, pairs of terms in database 36 (or in a predetermined cross-section thereof) that are highly correlated with each other. The inventors have found, in some applications, that block 102 is likely to present the user with important relationships within the database or the cross-section thereof. For example, in the cross-section of a news database having only articles including terms from a node, "Political terms," such important relationships may include a politician's name and the issues with which he is most associated. It is emphasized that the text mining tools of terms processor 90, in combination with interactive taxonomy editing, as provided by the present invention, have shown the ability (in the inventors' opinion) to extract knowledge, or useful content, from the database, and not simply to generate a list of articles that match terms in the user's query.

An "association discovery" block 104 preferably finds significant correlations among three or more topics in database 36. In particular, block 104 typically operates substantially automatically, finding relationships in the database that, in and of themselves, preferably aid in obtaining useful information from database 36. For example, association discovery block 104 may find that whenever "Microsoft" and "Justice Department" appear in a single document, there is a high likelihood that "Explorer" will also appear in the same document. It has been the inventors' experience that association discovery block 104 can reveal "buried" structure in the database being probed, typically structure which would require a user, not using the present invention, to invest a significant quantity of time in order to discover.

A "maximal sets" block 106 of terms processor 90 preferably automatically identifies a group of terms, in a cross-section of database 36, which are significantly more correlated with each other than with other terms. In this manner, clusters of conceptually- or otherwise-linked terms can be identified. For example, use of block 106 to look for clusters of countries in the Reuters news database might reveal that {"Libya", "Chad"}, {"Iran", "Iraq"}, and {"United States", "Canada", "Mexico"} were particularly highly correlated with each other, to the exclusion of other countries, during respective specific time periods. Should user 22 choose, she could select any of these clusters, and determine that most applicable news articles related to, respectively, the Libyan invasion of Chad, the Iran-Iraq War, or the North American Free Trade Agreement.

Searching for clusters of countries, companies, people, chemicals, diseases, etc., or even unspecified clusters, can enable the user to quickly obtain useful information. Other investigations might reveal that, for example, Eli Lilly & Co., Teva Pharmaceuticals, Ltd., and Prozac were heavily-discussed in the press in the same articles during a certain time period, or that, in articles mentioning the term "high-tech," Dell, Gateway, and Compaq are in one cluster, Microsoft, Apple, Sun, and IBM are in a second cluster, and Sony, Panasonic, and Sharp are in yet a third cluster.

Figure 5:
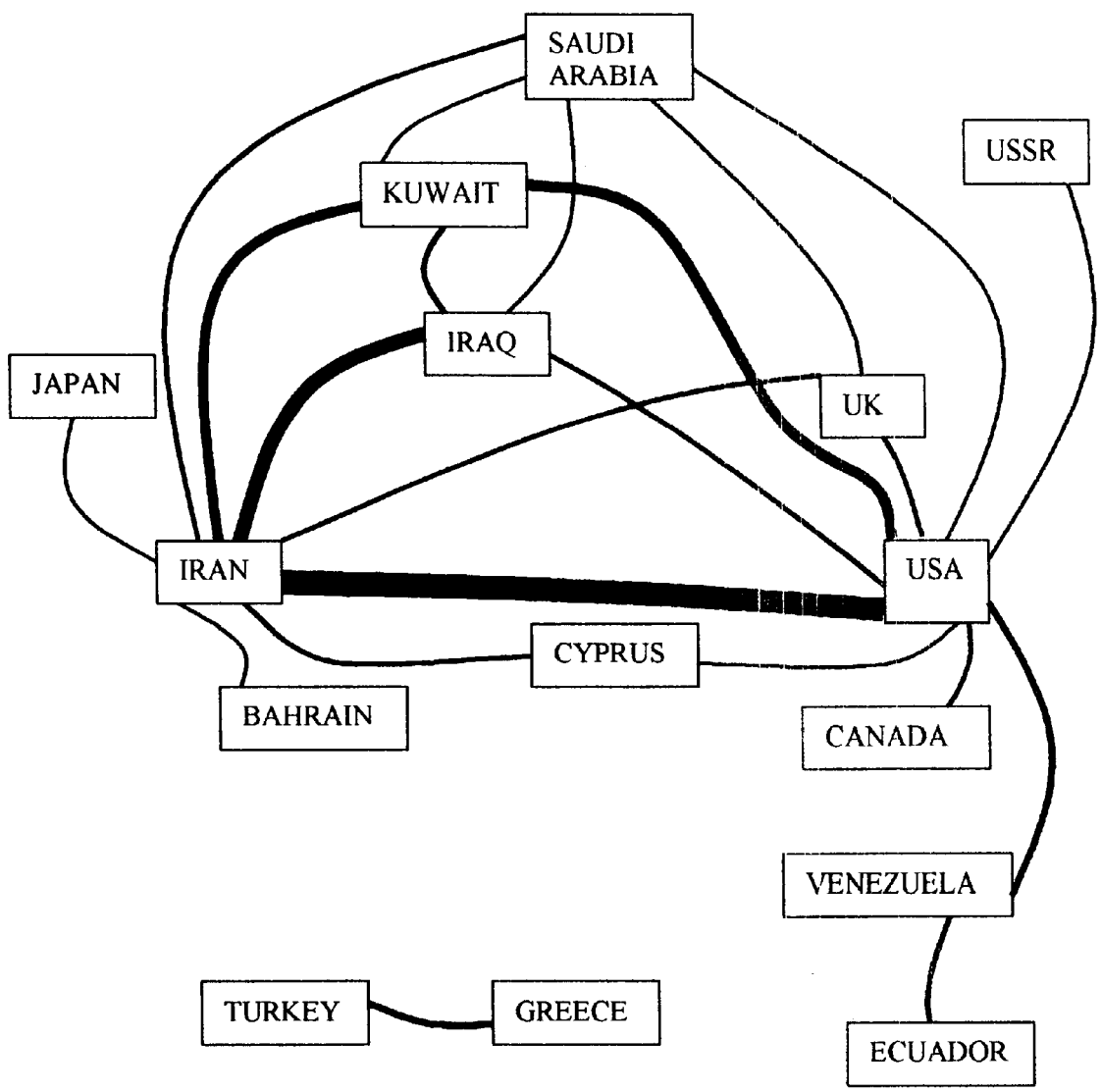
FIG. 5 is a graph illustrating an output of the text mining algorithm of FIG. 2, in accordance with a preferred embodiment of the present invention.

Reference is now made to FIGS. 2 and 5. FIG. 5 is a graph showing an output of terms processor 90, in accordance with a preferred embodiment of the present invention. A "keyword graphs" block 108 of terms processor 90 preferably generates graphs, consisting of a set of vertices, representing a set of terms of interest, and edges, representing quantitative relationships among the set of terms. Keyword graphs, as provided by the present invention, enable the user to quickly obtain meaningful relationships relevant to a set of terms in a database containing a large number of articles.

Typically, a keyword graph is defined with respect to a "context," usually an additional term or a node in the taxonomy. For example, FIG. 5 shows the results of a query, including the node "Countries" and the term "Crude oil," where the keyword graph represents countries as vertices, and the thickness of the edge connecting two vertices reflects the number of articles in the Reuters database containing both country names. An adjustable threshold of six articles containing a given two countries was set as a minimum requirement for drawing an edge therebetween, in order to increase the clarity of the graph, and to allow the most significant data to be clearly visible. It should be noted that a substantial quantity of meaningful data is displayed in FIG. 5, and that user 22 does not have to read any articles in the database in order to see significant facts about the relationships among the countries shown.

In another embodiment (not shown), the number of articles represented by an edge is alternatively or additionally written next to the edge, in order to enable a quantitative comparison of the number of articles represented by each edge. In still another embodiment (not shown), the color or darkness of each edge is related to the co-occurrence frequency of the respective vertices.

Preferably, by using the mouse to "double-click" on an edge, user 22 can cause the titles of articles from database 36 corresponding to that edge to be displayed by controller 24. Subsequent double-clicking on a title preferably causes the contents of the article to be displayed. In other queries, user 22 could see, for example, "Diseases" or "Companies" in the context of "Crude oil," or "Countries" in the context of "War" or "Sports."

A "trend graphs" block 110 of terms processor 90 (FIG. 2) is preferably used in conjunction with one or more of the other blocks of processor 90, in order to display significant changes in a given text mining result from a first time point to a second time point, or to construct a graph, which displays a text mining output parameter (e.g., the number of co-occurrences of "Microsoft" and "Justice Department") with respect to a time axis. Using block 110, is enabled to quickly discover the time course of the news coverage of a given issue. In an investigation using the Reuters database covering the early 1980's, the inventors asked, from those articles which mention Libya, what is the percentage that also mention Chad. It was determined using block 110 that the percentage went from 0% in a first three-month period to 35% in the following three-month period. Double-clicking on the line representing the second three-month period showed news articles dealing exclusively with fighting between Libya and Chad.

In another application using block 110, the ability to compare text mining results from two or more different sets of documents is used to compare text mining results from two or more databases at the same time point (rather than to compare the same database at two or more time points). For example, user 22 could investigate, quantitatively and/or graphically, differences in the sets of terms which are highly correlated with "Bill Clinton" in the New York Times, the Wall Street Journal, and the Jerusalem Post. Additionally, the present invention provides with the ability to combine the functions of several of the blocks of terms processor 90. For example, user 22 could expand the query from the previous example, to ask processor 26 to assess the terms most highly correlated with Bill Clinton, as reflected, respectively, in 30 domestic newspapers and 20 foreign newspapers. Preferably, the output would be displayed in terms of clusters of newspapers, each cluster focusing, perhaps, on a different aspect of Clinton's presidency.

Figure 6:
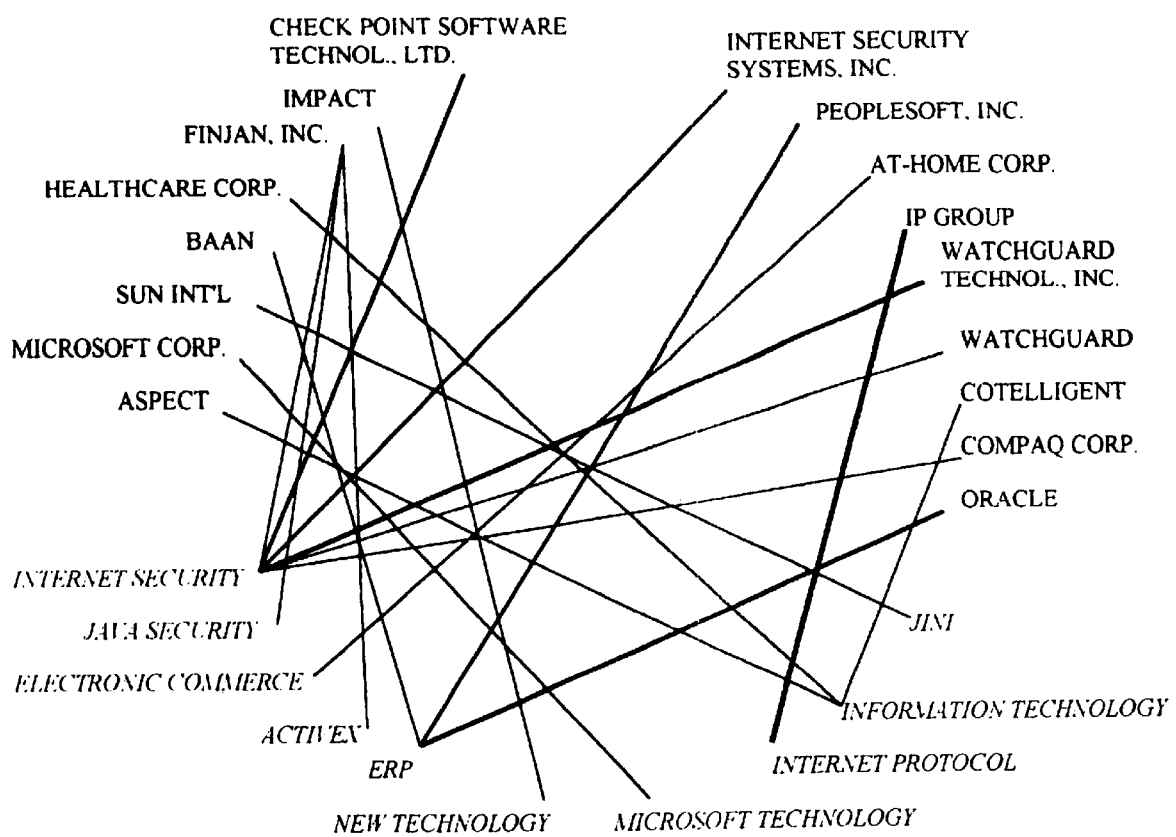
FIG. 6 is a graph illustrating another output of the text mining algorithm of FIG. 2, in accordance with a preferred embodiment of the present invention.

FIG. 6 is a graph illustrating another output of the text mining algorithm of FIG. 2, in a format which is particularly suitable for displaying a large number of terms, in accordance with a preferred embodiment of the present invention. In this example, user 22's query included the taxonomy nodes "Companies" and "Computer technologies," and was used to analyze a news database. Notably, the user specified only the two taxonomy nodes, the database, and the output format. Responsive thereto, processor 26 reviewed all of the terms (generated by term generator 80) associated with each of the articles in the database, and recorded instances in which one of the companies co-occurred in the same sentence with one of the specified computer technologies. Subsequently, processor 26 tabulated the results, and displayed, as shown in FIG. 6, only those companies and technologies whose co-occurrences in the database surpassed a user-set threshold. The thickness of the lines connecting respective companies and technologies represents, as in FIG. 5, the respective number of co-occurrences.

Typically, generation of a graph like that in FIG. 6 takes not more than several seconds from the time that user 22 enters the query, and, in this example, immediately provides the user with an overview of which companies are associated with which technology groups, and to what extent has this association been reported in the database. For example, the user sees that "Finjan, Inc. " is associated with three technology groups, six companies are associated with "Internet security," and most of the companies are associated with only one technology group. By double-clicking on any line, can preferably see a list of titles from news articles "underlying" that line, with the respective company and technology group highlighted.

Additionally, by double-clicking on any title, the entire contents of the article are preferably displayed.

Preferably, the user can select a "co-occurrence proximity threshold," i.e., the maximum distance between two terms in a query such that processor 26 should record a correlation between the two terms. Typically, the co-occurrence proximity threshold is specified as a certain number of words, sentences or paragraphs, or, simply, as co-occurrence within the same article. In general, increasing the proximity threshold increases the number of articles deemed relevant during text mining but tends to decrease the specificity, or "value," of the identified co-occurrence. For example, the user typically would not want processor 26 to report an association between the terms "Iraq" and "Tobacco," if the two terms' closest proximity in an article is several paragraphs. The inventors have found that a co-occurrence proximity threshold of approximately one sentence is generally optimal for many applications of the present invention.

Alternatively or additionally, a "weight" is assigned to a co-occurrence of two terms in a document responsive to the proximity of the two terms, so that, for example, a consistent trend of co-occurrences of the terms "Iraq" and "Tobacco" in documents in the database will be reported, even if in all of the documents the terms are separated by a relatively large distance.

Thus, according to preferred embodiments of the present invention, processor 26 actually mines the document's text, using the generated list of terms only to indicate potentially-relevant documents. It is the inventors' opinion that referring to the text of a document during the text mining process, as described hereinabove, increases the quality of the results, generally by reducing the number of documents erroneously identified as "relevant. "

As described hereinabove, the user is enabled to set a threshold number of co-occurrences, below which a line will not be drawn connecting two terms. This typically serves two functions. First, it reduces the effect of "coincidental" co-occurrences, e.g., a correlation between "London" and "Jacques Chirac," based on the sentence, "While flying to London, President Clinton telephoned President Jacques Chirac to discuss trade issues. " Second, control of the threshold gives the user the ability to see a very large number of related terms in one graph, or, alternatively, to focus on the several co-occurrences which appear with the highest frequency in the database. The inventors have found that, generally speaking, a threshold value of between about three and five co-occurrences tends to significantly reduce the appearance of coincidental co-occurrences.

FIG. 7 is a flow chart schematically illustrating details of term generator 80, described hereinabove with reference to FIG. 2, in accordance with a preferred embodiment of the present invention. In general, term g-generator 80 analyzes each document in database 36, in order to generate a set of terms ("document-labeling terms") relevant to the content of the respective document. Terms are typically single words, such as "Bank," or "Livestock," or multiple words, such as "Hudson River," or "Personal computer. " If a document in the database has already been "categorized," i.e., had a set of terms attached to it (whether by generator 80, by other categorizing software, or by a human), then that document is typically skipped, and the following document in the database is analyzed by term generator 80. Alternatively, documents categorized by humans or by other categorizing software are nevertheless analyzed by generator 80, which typically yields a greater number of relevant terms than do humans or categorizing software commonly known in the art.

In analyzing a document, term generator 80 typically executes three steps: linguistic processing, term generation, and term filtration. These are generally performed in substantially the same manner as that described in the above-referenced paper, "Text Mining at the Term Level." During linguistic processing, the document is analyzed on the basis of grammatical rules, in order to determine the structure of each sentence. During the term generation step, sequences such as "Noun-noun," "Noun-preposition-noun," "Adjective-noun," etc., are used to identify "candidate" terms. Single and multiple-word candidate terms, such as "Airplane," "Point of view," "Same time," "Health program for the elderly," or "King Fahd of Saudi Arabia," can be produced during the term generation step.

The term generation step generally produces a set of terms associated with each document, without taking into account the relevance of these terms in the framework of the whole collection of documents. Filtering of these terms is required in order to retain relevant terms and to remove terms that have no particular relevance to the document being examined, in comparison to their relevance to other documents in the database. Typically, a term is deemed "relevant" if its frequency of occurrence in a given document is significantly greater than its frequency of occurrence in the entire database. The inventors have found that, generally, terms such as "Same time," and "Point of view," are removed during the term filtration step, because they are unlikely to appear in any given document with a statistically significantly different frequency than in the entire collection of documents. Alternatively or additionally, other methods known in the art, particularly those described in the "Text Mining" paper cited above, are utilized in implementing term generator 80.

The microfiche appendix attached hereto and incorporated herein by reference includes an embodiment of the present invention in software, which is covered by copyright belonging to Clearforest, Ltd. In this appendix, the software embodiment is named NKDT.exe. The software is provided in binary code, executable on an Intel Pentium II processor running with the Microsoft Windows NT 4.0 operating system. The microfiche appendix also includes additional supplementary files necessary for the proper execution of NKDT.exe. These files include:

adj.inv,
lemmas.inv,
senx.tags, and
Abbr.txt

These five files are text (ASCII format) files, and should reside in the same directory as NKDT.exe. To run the software, use the Windows NT "run" function, with the file NKDT.exe. Use the application's "help" for explanation on how to use the software. Press F1 (function key 1) to obtain the help.

In addition, the microfiche appendix includes sample data, which demonstrate the use of the software. The sample data are in three files:

test.dre,
test.drf, and
test.tax.

The test.drf file contains a representation of data in a document. The test.tax file contains a relevant taxonomy. The test.dre file is for internal usage by the software. When installing the software, it is recommended that all three files be located in the same directory as NKDT.exe.

In the microfiche appendix, all of the above files have been compressed using the ZIP compression program. The appendix contains a self-extractable ZIP file, which, when executed, provides all of the above files. To extract the file, copy the data provided in the microfiche into an appropriate computer, and run the application using the operating system "run" function.

It will be understood by one skilled in the art that aspects of the present invention described hereinabove can be embodied in a computer running software, and that the software can be stored in tangible media, e.g., hard disks, floppy disks or compact disks, or in intangible media, e.g., in an electronic memory, or on a network such as the Internet. It will be appreciated generally that the preferred embodiments described above are cited by way of example, and the full scope of the invention is limited only by the claims.

What is claimed is:

1. A method for mining in a database including documents, the documents including text, the method comprising:

providing a taxonomy of taxonomy terms;

mining the documents responsive to the taxonomy to discover a relationship between two or more of the taxonomy terms;

analyzing, over a plurality of the documents, co-occurrences of substantially every one of the two or more taxonomy terms with substantially every other one of the two or more taxonomy terms, to determine relationships among the two or more taxonomy terms to extract information not specified by the taxonomy relating to the two or more taxonomy terms; and presenting the information relating to the two or more taxonomy terms to a user by displaying at least some of the two or more taxonomy terms and displaying an output indicative of the number of the co-occurrences of substantially each of the at least some terms with substantially every other one of the at least some terms.

2. A method according to claim 1, wherein analyzing occurrences of the relationship comprises identifying, responsive to the taxonomy, one of: a fact and an event, inherent in the text of one of the documents.

3. A method according to claim 2 wherein the fact or event is identified by the proximity, in one of the documents, of the two or more taxonomy terms to a predetermined relationship term.

4. A method according to claim 1, wherein the taxonomy comprises nodes and one of the nodes is a parent entry of the two or more taxonomy terms.

5. A method according to claim 1, wherein the taxonomy comprises a hierarchy of nodes, wherein a first node is a parent entry of at least one of the two or more taxonomy terms, wherein a second node is also a parent entry of at least one of the two or more taxonomy terms, and wherein the relationship comprises a relationship between the second node and the first node.

6. A method according to claim 1, further comprising displaying a portion of the text of at least one of the documents responsive to the discovered relationship.

7. A method according to claim 1, wherein mining comprises extracting a set of one or more document-labeling terms from one of the documents, wherein the set includes the two or more taxonomy terms.

8. A method according to claim 7, wherein extracting the set of document-labeling terms from the document comprises:

determining the grammatical structure of a sentence in the document's text; and identifying a group of one or more words in the sentence as a document-labeling term responsive to the grammatical structure.

9. A method according to claim 7, wherein extracting the set of document-labeling terms from the document comprises:

examining the document;

identifying a candidate term in the document;

comparing a frequency of occurrence of the candidate term in the document with frequencies of occurrence of the candidate term in other documents in the database to determine differences in the respective frequencies of occurrence; and inserting the candidate term into the set of document-labeling terms corresponding to the document responsive to the comparison.

10. A method according to claim 1, wherein discovering the relationship comprises finding in at least one of the documents a co-occurrence of at least some portion of the two or more taxonomy terms.

11. A method according to claim 10, wherein the two or more taxonomy terms comprise a cluster of taxonomy terms, wherein the cluster is characterized by the property that terms in the cluster generally have a higher frequency of co-occurrence with respect to each other than their frequency of co-occurrence with respect to terms not in the cluster.

12. A method according to claim 10, wherein discovering the relationship comprises assigning a weight to the co-occurrence responsive to a distance between a first term and a second term of the two or more taxonomy terms, and wherein analyzing occurrences of the relationship comprises analyzing the relationship responsive to the weight.

13. A method according to claim 10, wherein a first term and a second term of the two or more taxonomy terms co-occur in a document when a distance between the first and second terms is less than a predetermined distance.

14. A method according to claim 13, wherein the predetermined distance is approximately one paragraph.

15. A method according to claim 13, wherein the predetermined distance is approximately one sentence.

16. A method according to claim 1, wherein discovering the relationship comprises discovering a plurality of relationships in two or more of the documents, and wherein analyzing comprises:

analyzing the relationships in a first set of the two or more documents, in order to determine a first relationship between the two or more taxonomy terms;

analyzing the relationships in a second set of the two or more documents, in order to determine a second relationship between the two or more taxonomy terms; and comparing the first and second relationships.

17. A method according to claim 16, wherein the first set of documents comprises documents from a first time period, and wherein the second set of documents comprises documents from a second time period.

18. A method according to claim 1 wherein at least one of the two or more taxonomy terms is selected by the user.

19. A method according to claim 1 wherein each of the two or more taxonomy terms is selected by the user.

20. A method according to claim 1 wherein presenting the information comprises displaying a graph comprising a plurality of points, each point representing one of the two or more taxonomy terms, and one or more lines, each line connecting two of the points and indicating a quantitative relationship between the terms represented by said two points.

21. A method according to claim 20 wherein the thickness of each line in the graph indicates the quantitative relationship.

22. A method according to claim 20 wherein a number displayed near each line in the graph indicates the quantitative relationship.

23. A method according to claim 20 wherein the color of each line in the graph indicates the quantitative relationship.

24. A method according to claim 20 wherein the quantitative relationship indicated by a line in the graph is a co-occurrence frequency of the terms represented by the two points connected by that line.

25. A method for mining in a database including documents, the documents including text, the method comprising:

providing a taxonomy of terms, the taxonomy comprising a hierarchy of nodes, wherein at least one taxonomy term comprises two or more related taxonomy terms, and one of the nodes is a parent entry of the two or more taxonomy terms, mining the documents responsive to the taxonomy to discover a relationship between a set of one or more selected words and at least one of the taxonomy terms; and modifying the taxonomy responsive to the discovered relationship by prompting a user to assign one or more of the selected words to be sibling in the taxonomy of the two or more taxonomy terms.

26. A method according to claim 25, wherein the relationship comprises a co-occurrence of one of the set of selected words and the at least one taxonomy term.

27. A computer program product for mining in a database including documents, the documents including text, the program having computer-readable program instructions embodied therein, which instructions cause a computer to:

provide a taxonomy of taxonomy terms;

mine the documents responsive to the taxonomy to discover a relationship between two or more of the taxonomy terms;

analyze, over a plurality of the documents, co-occurrences of substantially every one of the two or more taxonomy terms with substantially every other one of the two or more taxonomy terms, to determine relationships among the two or more taxonomy terms and to extract information not specified by the taxonomy relating to the two or more taxonomy terms; and display at least some of the two or more taxonomy terms and display an output indicative of the number of the co-occurrences of substantially each of the at least some terms with substantially every other one of the at least some terms.

28. A product according to claim 27, wherein analyzing occurrences of the relationship comprises identifying, responsive to the taxonomy, one of: a fact and an event, inherent in the text of one of the documents.

29. A product according to claim 27, wherein the taxonomy comprises nodes and one of the nodes is a parent entry of the two or more taxonomy terms.

30. A product according to claim 27, wherein the taxonomy comprises a hierarchy of nodes, a first node is a parent entry of at least one of the two or more taxonomy terms, wherein a second node is also a parent entry of at least one of the two or more taxonomy terms and wherein the relationship comprises a relationship between the second node and the first node.

31. A product according to claim 27, wherein:

analyzing comprises analyzing, over a plurality of the documents, co-occurrences of substantially every one of the two or more taxonomy terms with substantially every other one of the two or more taxonomy terms, to determine relationships among the two or more taxonomy terms; and presenting the information comprises displaying at least some of the two or more taxonomy terms and displaying an output indicative to the number of the co-occurrences of substantially each of the at least some terms with substantially every other one of the at least some terms.

32. A product according to claim 27, wherein the instructions cause the computer to display a portion of the text of at least one of the documents responsive to the discovered relationship.

33. A product according to claim 27, wherein mining comprises extracting a set of one or more document-labeling terms from one of the documents, wherein the set includes the two or more taxonomy terms.

34. A product according to claim 33, wherein extracting the set of document-labeling terms from the document comprises:

determining the grammatical structure of a sentence in the document's text; and identifying a group of one or more words in the sentence as a document-labeling term responsive to the grammatical structure.

35. A product according to claim 33, wherein extracting the set of document-labeling terms from the document comprises:

examining the document;

identifying a candidate term in the document;

comparing a frequency of occurrence of the candidate term in the document with frequencies of occurrence of the candidate term in other documents in the database to determine differences in the respective frequencies of occurrence; and inserting the candidate term into the set of document-labeling terms corresponding to the document responsive to the comparison.

36. A product according to claim 27, wherein discovering the relationship comprises finding in at least one of the documents a co-occurrence of at least some portion of the two or more taxonomy portions.

37. A product according to claim 36, wherein the two or more taxonomy terms comprise a cluster of taxonomy terms, wherein the cluster is characterized by the property that terms in the cluster generally have a higher frequency of co-occurrence with respect to each other than their frequency of co-occurrence with respect to terms not in the cluster.

38. A product according to claim 36, wherein discovering the relationship comprises assigning a weight to the co-occurrence responsive to a distance between a first term and a second term of the two or more taxonomy terms, and wherein analyzing occurrences of the relationship comprises analyzing the relationship responsive to the weight.

39. A product according to claim 36, wherein a first term and a second term of the two or more taxonomy terms co-occur in a document when a distance between the first and second terms is less than a predetermined distance.

40. A product according to claim 39, wherein the predetermined distance is approximately one paragraph.

41. A product according to claim 39, wherein the predetermined distance is approximately one sentence.

42. A product according to claim 27, wherein discovering the relationship comprises discovering a plurality of relationships in two or more of the documents, and wherein analyzing comprises:

analyzing the relationships in a first set of the two or more documents, in order to determine a first relationship between the two or more taxonomy terms;

analyzing the relationships in a second set of the two or more documents, in order to determine a second relationship between the two or more taxonomy terms; and comparing the first and second relationships.

43. A product according to claim 42, wherein the first set of documents comprises documents from a first time period, and wherein the second set of documents comprises documents from a second time period.

44. A method for mining in a database including documents, the documents including text, the method comprising:

providing a taxonomy of taxonomy terms;

mining the documents at a taxonomy term level to provide mining results indicative of a relationship between a plurality of terms including at least one taxonomy term, wherein at least one of the terms is specified by a user; and displaying a graph comprising a plurality of points, each point representing one of the plurality of terms, and one or more lines, each line connecting two of the points and indicating a quantitative relationship between the terms represented by said two points; and prompting the user to modify the taxonomy based on the mining results.

45. A method according to claim 44 further comprising performing a statistical analysis on the mining results to determine a potential modification of the taxonomy.

46. A method according to claim 45 wherein prompting the user to modify the taxonomy comprises prompting the user on whether or not to carry out the potential modification of the taxonomy.

47. A method according to claim 44 wherein at least one of the plurality of terms is received in a query entered by the user.

48. A method according to claim 47, wherein the taxonomy comprises a hierarchy of nodes, one of the nodes being a parent entry of the at least one taxonomy term and one or more additional taxonomy terms related thereto, and wherein discovering the relationship comprises determining that another of the plurality of taxonomy terms co-occurs with a cohort of the related terms, wherein the cohort is of at least a minimum size.

49. A method according to claim 48 wherein each of the plurality of terms is a taxonomy term.

50. A method according to claim 44 wherein at least one of the plurality of terms is a taxonomy term specified by the user.

51. A method according to claim 44 wherein at least two of the plurality of terms are taxonomy terms specified by the user.

52. A method according to claim 44, wherein discovering the relationship comprises finding, in at least one of the documents, a co-occurrence of the at least one taxonomy term with another of the plurality of taxonomy terms.

53. A method according to claim 52, wherein the at least one taxonomy term comprises a cluster of taxonomy terms, wherein the cluster is characterized by the property that taxonomy terms in the cluster generally have a higher frequency of co-occurrence with respect to each other than their frequency of co-occurrence with respect to taxonomy terms not in the cluster.

54. A method according to claim 52, wherein discovering the relationship comprises assigning a weight to the co-occurrence responsive to a distance between the terms, and wherein analyzing occurrences of the relationship comprises analyzing the relationship responsive to the weight.

55. A method according to claim 52, wherein discovering the relationship comprises finding, in at least one of the documents, a co-occurrence of the at least one taxonomy term with another of the plurality of taxonomy terms where a distance between the terms term is less than a predetermined distance.

56. A method for mining in a database including documents, the documents including text the method comprising:

providing a taxonomy of taxonomy terms;

mining the documents at a taxonomy term level to provide mining results indicative of a relationship between a plurality of terms including at least one taxonomy term, wherein at least one of the terms is specified by a user; and presenting the mining results to the user by displaying a graph comprising a plurality of points, each point representing one of the plurality of terms, and one or more lines, each line connecting two of the points and indicating a quantitative relationship between the terms represented by said two points by displaying a number near each line.

57. A method according to claim 56 wherein at least one of the plurality of terms is received in a query entered by the user.

58. A method according to claim 56 wherein the quantitative relationship indicated by a line in the graph is a co-occurrence frequency of the terms represented by the two points connected by that line.

59. A method according to claim 58 further comprising:

when the user selects a particular line in the graph, displaying a list of one or more documents in which the terms represented by the two points connected by that line co-occur.

* * * * *